United States Patent
Peinado

(10) Patent No.: US 7,062,622 B2
(45) Date of Patent: Jun. 13, 2006

(54) PROTECTION OF CONTENT STORED ON PORTABLE MEMORY FROM UNAUTHORIZED USAGE

(75) Inventor: Marcus Peinado, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 09/896,781

(22) Filed: Jun. 29, 2001

(65) Prior Publication Data

US 2003/0005246 A1    Jan. 2, 2003

(51) Int. Cl.
*G06F 12/14* (2006.01)

(52) U.S. Cl. .................... 711/163; 711/115; 726/27

(58) Field of Classification Search ................ 710/200; 711/111, 115, 163, 164, 200; 713/200
See application file for complete search history.

(56) References Cited

U.S. PATENT DOCUMENTS

| | | | | |
|---|---|---|---|---|
| 4,860,128 A | * | 8/1989 | Nakagawa | 360/60 |
| 5,426,762 A | * | 6/1995 | Nakagawa | 711/115 |
| 5,778,421 A | * | 7/1998 | Nagano et al. | 711/115 |
| 6,032,257 A | * | 2/2000 | Olarig et al. | 713/200 |
| 6,453,379 B1 | * | 9/2002 | Nishiumi et al. | 711/4 |
| 6,691,232 B1 | * | 2/2004 | Wood et al. | 713/201 |

OTHER PUBLICATIONS

Popp, R., et al., "A Security Architecture for Mobile Personal Communication Services Among Heterogeneous Networks," *ITG-Fachberichte*, 1995, 135, 423-432.
Alrashid, Tareq. M., et al., "Safeguarding Copyrighted Contents," *D-Lib Magazine*, Apr., 1998, 1-10.

* cited by examiner

*Primary Examiner*—Gary Portka
(74) *Attorney, Agent, or Firm*—Woodcock Washburn LLP

(57) ABSTRACT

A device for securely recording protected content to a portable memory, and for reading the protected content therefrom. The device includes a feature that makes it adapted to read or write specially-configured portable memories that are incompatible with standard read/write devices. For example, the device may be designed to work with memories having an unusual shape or size, or may manipulate the data in a non-standard way before storing it on the memory. The read/write devices are trusted components that will only handle the protected content in accordance with rules governing the content. The feature included in the device is preferably a proprietary and/or hardware feature, so that counterfeit devices incorporating the feature cannot be built without overcoming economic and/or legal hurdles. Because of the hurdles to building devices compatible with the specially-configured portable memory, protected content can be transferred to such a memory with reasonable assurance that the content will not be widely copied.

13 Claims, 4 Drawing Sheets

PROTECTION OF CONTENT STORED ON PORTABLE MEMORY FROM UNAUTHORIZED USAGE

FIELD OF THE INVENTION

The present invention is directed generally to the protection of digital content. More particularly, the invention is directed to a system and method for protecting content stored on portable memory against unauthorized use.

BACKGROUND OF THE INVENTION

Portable memories may be used to store content and transfer the content between computing devices. Examples of such portable memories include CD-ROM, DVD-ROM, floppy disk, tape, flash memories, etc. Data may be recorded onto one of these portable memories using a read/write device connected to a first computer. The portable memory may then be removed from the first computer, and inserted into the reading device of a second computer. Using this technique, it is possible use a portable memory to transfer data between any two computers that have a read/write device for that portable memory. Moreover, in the case of content data (e.g., music, video), it may be desirable to place the content on a portable memory so that a single consumer can use the memory on various reading devices (e.g., living room CD player, car CD player, etc.).

While the ease of data transfer brought about by portable memories has advantages, it also presents problems. Some data is sensitive or proprietary (e.g., copyrighted audio or video), and it is desirable to control the dissemination of such data. One solution is to encrypt the data using a conventional encryption algorithm prior to storing it on a portable memory. A wide variety of encryption algorithms are known which provide good security. However, when encryption is used, the decryption key must be stored somewhere if the content is to be usable—e.g., the key may be stored in the portable memory reading device, or in a program that uses the data after it is retrieved from the portable memory. The best efforts to obscure the key (e.g., multiple encryption of the key, scattering of the key throughout data, embedding the key in secure hardware, etc.) can be broken. Even if it takes an enormous and expensive effort to discover the key, once the key is discovered the content can be decrypted and distributed in clear-text for the entire world to see. Worse, since encryption algorithms are generally well-known, once the key is discovered, software running on a general-purpose computer can be used to decrypt the content.

An example of the problem is a "globally shared secret" key which is known to a class of supposedly secure memory reading devices or data rendering programs. The secret key can be hidden in each such device or program using the best protection mechanisms that technology provides. The device may be designed or programmed not to use the key except under permitted circumstances. However, since the same key is hidden in perhaps millions of devices or programs, an enormous number of people have an opportunity to analyze the device or program to discover the key. It is a virtual certainty that a key used in this manner will eventually be discovered.

It is therefore clear that a potential for security breach exists when sensitive or proprietary data is stored on a portable memory. Thus there is a need for a system that overcomes the drawbacks of the prior art.

SUMMARY OF THE INVENTION

The invention provides a technique for protecting content that is stored on portable memory devices. A memory reader is provided which is capable of reading a particular type of portable memory. The memory reader is designed, either through circuitry or programming, not to provide the data stored on a portable memory except under defined circumstances. For example, the reader may be programmed to authenticate the recipient of the data prior to providing the data.

The memory and reader are designed such that the memory cannot easily be read by any reading device other than the one that it is designed to work with. For example, if the memory is an optical disk, the optical disk may be of a non-standard shape or size so that it will not fit in the drive of commonly-available readers such as CD-ROM drives. If the memory is a flash card, then the flash card and its reader may use a non-standard plug interface. The non-standard disk, or non-standard plug interface, may be proprietary to the entity that oversees the content distribution scheme (e.g., the publisher of content, the manufacturer who provides software and hardware that enables secure content distribution, etc.). Using such non-standard hardware ensures that one who wishes to create a "rogue" reader that reads the content on the memory without observing the security scheme will have to invest in building (and possibly mass-producing) a new hardware device. The hardware features may be proprietary, thereby presenting legal hurdles to the creation of counterfeit devices.

While it is relatively easy to wage purely software-based attacks against security schemes, a security technique that cannot be broken without investing in new hardware tends to deter hacking attempts. In particular, the general population of computer users may not bother to break the protection scheme if it requires more effort than downloading a "security-breaking" program from the Internet, or following a very simple set of hardware-modification instructions (e.g., clip a wire, flip a switch, etc.)

As an alternative to using non-standard hardware, the reader may be programmed to use a non-standard data representation scheme. For example, read/write devices may encrypt/decrypt the content with an unusual, non-standard cryptographic algorithm, or may use a non-standard compression or data-reordering scheme. The particular method of representing the data may be proprietary, thereby deterring creation of "rogue" devices that implement the scheme.

A class of difficult-to-spoof read/write devices is created according to the above criteria. Each read/write device may be equipped with a certified key pair for use in authentication. Thus, trusted programs or devices that handle secure content will not provide secure content for storage on portable memories to a read/write device unless the device can authenticate itself. Similarly, the read/write device will not provide content to other devices (e.g., rendering devices, PCs, etc.) without authenticating those devices. Because the non-standard or proprietary features of the reading device make it difficult to "spoof," the universe of devices that can read and write the portable memory is limited, and distribution of secure content is controlled.

In a preferred embodiment, the above-mentioned authentication between the read/write device and the rendering device does not take place cryptographically. As an alternative to cryptographic authentication, the interface between a rendering device and a read/write device may incorporate unique and/or proprietary hardware features that make the interface difficult to spoof—features similar to those discussed above in connection with the interface between the read/write device and the portable memory. Because the manufacturer of a counterfeit read/write device or rendering device would have to invest in building hardware incorporating the feature, the production of counterfeit read/write devices or rendering devices is deterred. This deterrence may limit the number of counterfeit read/write devices and rendering devices to the point that authenticity of the devices may be presumed from the existence of a successful connection between them.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3C is a block diagram of a third exemplary read/write device having an anti-counterfeit feature in accordance with aspects of the invention;

FIG. 3D is a sectional view of the plug interface of FIG. 3C taken along line 3D—3D;

DETAILED DESCRIPTION OF THE INVENTION

Overview

The invention is directed to the storage on portable memory of data that is subject to usage rules. "Rules," in this context, means limitations on the usage of the data such as how it can be used (e.g., copying, printing, ephemeral rendering, etc.), when it can be used, and by whom it can be used. For example, a rule may state that a song may be played back on any host device, but that no copies may be made. A rule governing data may be global rule that applies to all data of a certain class. Alternatively, the rule could be described explicitly and stored with the data, or otherwise associated with the data. An explicitly described rule governing usage is sometimes referred to as an "electronic license" or "digital license." Electronic licenses and protection of data are described in U.S. Pat. No. 5,715,403 entitled "System for Controlling the Distribution and Use of Digital Works Having Attached Usage Rights Where the Usage Rights Are Defined by a Usage Rights Grammar," and in U.S. patent application Ser. No. 09/290,363 entitled "Enforcement Architecture and Method for Digital Rights Management," which are both incorporated herein by reference.

When data is protected by a rule, it is paramount that any device that handles the data be trusted—up to at least some degree of reliability—not to handle the data in any manner that is inconsistent with the rule. It should be observed that this principle applies whether the rule that governs the data is explicitly stated in the form of an electronic license, or if it is an "implicit" rule that applies globally to all data without being expressly stated in the form of a license. In the case of an implicit global rule, a device that handles the data must be trusted to obey the global rule with respect to all data. In the case of data that is protected by an explicit electronic license, a device must be trusted to honor whatever terms are stated in the license. The invention applies equally to both cases. Thus, before a trusted device will transmit protected data to another device, the receiving device must prove its trustworthiness. It is in the context of establishing this trust that the invention applies. As described below, proprietary hardware or software features may be used to establish that trust.

Exemplary Computing Environment

Figure 1:
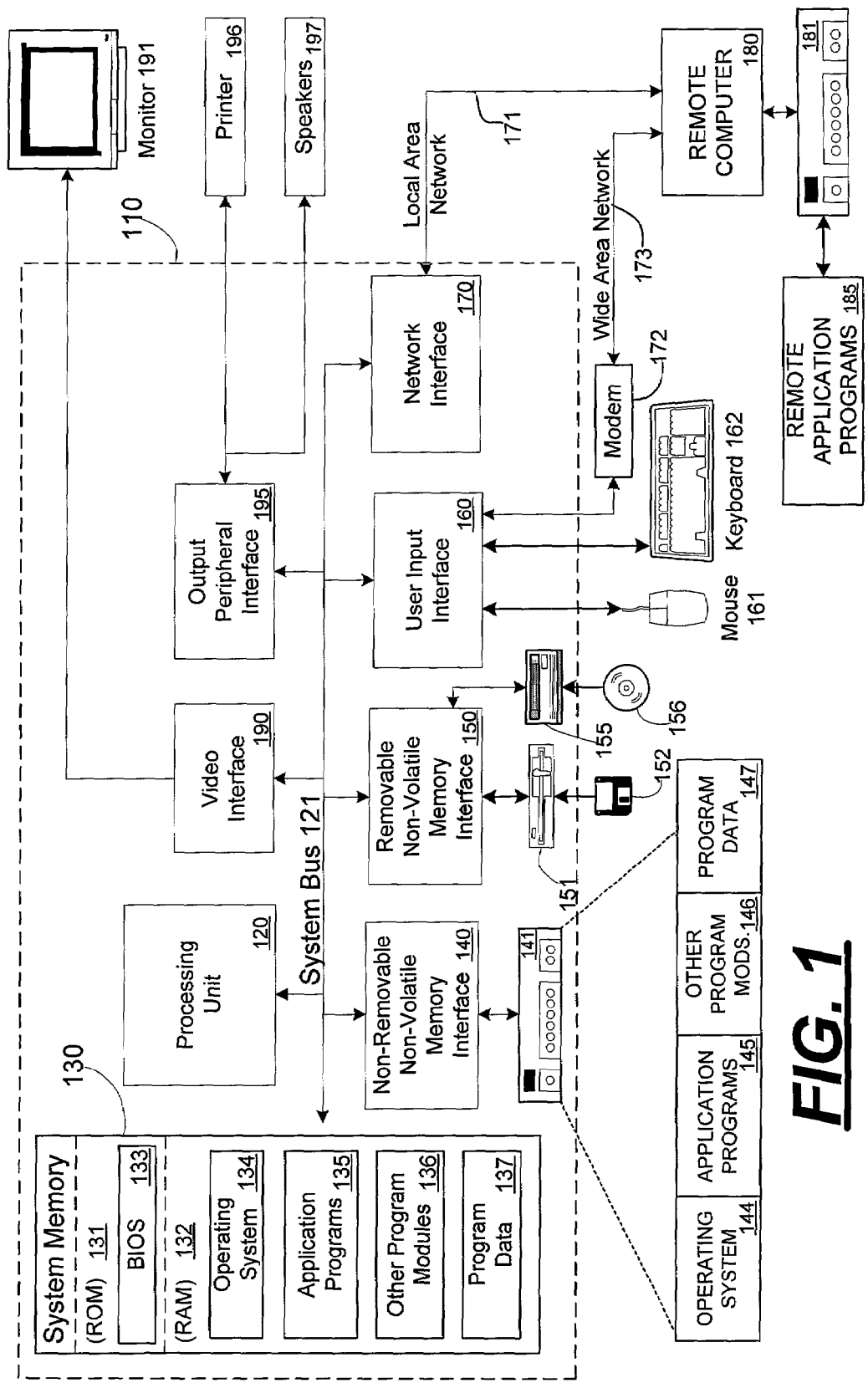
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Portable Memory and Related Hardware

The invention applies to environments employing certain types of hardware. A brief description of these types of hardware is provided below.

"Portable memory" provides the capability of storing data—usually relatively large amounts of data. Furthermore, a portable memory can be physically moved between different host devices. The portable memory may provide read-only access or read/write access. Examples of portable memory include optical media such as compact discs (CDs), mini-CDs, and digital versatile disks (DVDs); magnetic media, such as floppy disks or removable hard disks; removable cassette tapes, such as JAZ tapes; or flash memory, such as compact flash cards. Magnetic disk 152 and optical disk 156, shown in FIG. 1, are non-limiting examples of portable memories. The following two properties of portable memories are of particular relevance to the issues addressed by the invention: (a) a portable memory can store data; and (b) a portable memory can be attached to different host devices to read or write the data.

"Rendering devices" or "data sources" are host devices, which generate, receive or transfer the data, stored on a portable memory. Examples of data sources are general-purpose computing devices (e.g., PCs, palm-size computers or "PDAs," mainframe computers, etc.) and special purpose consumer electronics (CE) devices, such as digital cameras. Examples of rendering devices are again general-purpose computing devices, such as PCs, and special purpose CE devices (e.g., CD players, MP3 players, monitors, e-books readers, etc.). Since many rendering devices have the capability to serve as data sources, the term "rendering device" and "data source" is used interchangeably herein to refer to a device that has both capabilities, unless context indicates otherwise.

"Memory readers" or "read/write devices" constitute the hardware interface between the portable memory device and the host devices. For example, a standard CD constitutes a portable memory. A PC is a host device. In order to be able to use CDs, a PC must have a CD player to read the CD, or a CD burner to write the CD. The CD player/burner constitutes the memory reader: the hardware interface between the PC (host device) and the CD (portable memory). Because many portable memory readers also have the capability to write to memory, the term "memory reader" and "read/write device" are used interchangeably herein to refer to devices that can either read or write portable memories, as well as devices that do both, unless context indicates otherwise.

Functionally, the relationship between these components can be explained as follows: Any given portable memory should interoperate across all corresponding memory reader/host device combinations. Data written on any given memory reader/host device combination can be read at any other memory reader/host device combination. This relationship is characteristic of the "global access property" of portable memory.

Figure 2:
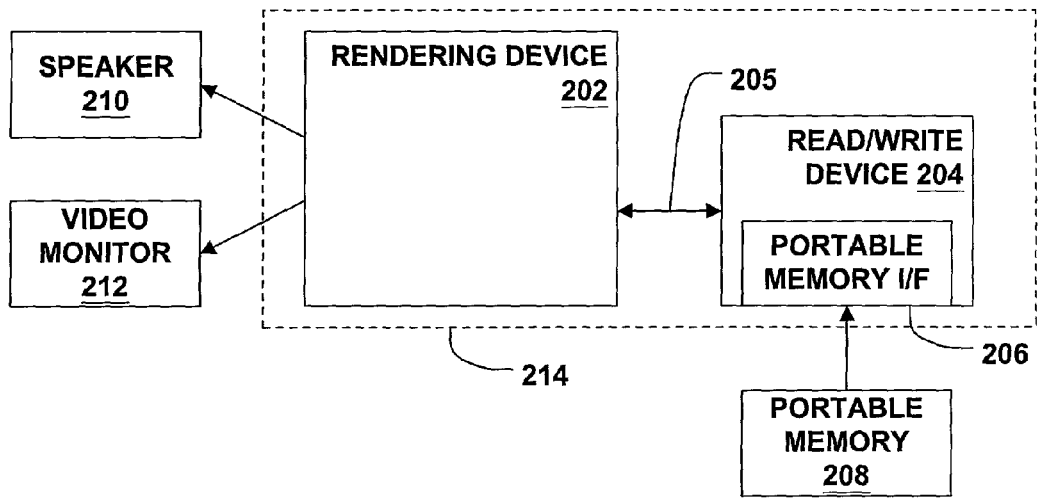
FIG. 2 is a block diagram of a rendering device, read/write device, and portable memory in accordance with aspects of the invention.

The relationship between a portable memory, a read/write device, and a rendering device is shown in FIG. 2. Rendering device 202 is communicatively connected to read/write device 204 by communication link 205. Read/write device 204 includes a portable memory interface 206. Portable memory 208 is mountable on portable memory interface 206, such that portable memory 208 may be read and/or written by read/write device 204. Read/write device 204 reads and/or writes portable memory 208. The information that is read or written is communicated between read/write device 204 and rendering device 202 over communication link 205. Rendering device 202 then processes the contents received from read/write device 204 (e.g., amplifies an analog signal, converts a digital signal to analog, decompresses MPEG audio, etc.) and renders it through an appropriate output device such as audio speaker 210, video monitor 212, etc.

Rendering device 202 and read/write device 204 may take the form of physically separate units. For example, if the rendering device is a PC, the user may connect an external DVD-ROM drive to the PC through a cable. Alternatively, rendering device 202 and read/write device 204 may be enclosed within a single case 214, and thus may be packaged as a single unit. For example, a standard CD player typically includes both the processor and logic that render digital audio (i.e., the rendering device), as well as the drive that reads the disc (i.e., the read/write device). However, even where rendering device 202 and read/write device 204 come packaged within a single case 214, rendering device 202 and read/write device 204 are still separate units in the sense that one could open the case and replace one read/write device with another. Because this possibility exists, rendering device 202 and read/write device 204 are treated separately for the purpose of the discussion herein, regardless of whether they are enclose in a single case 214.

Hardware with Spoof-Resistant Features

A read/write device in accordance with the invention includes one or more features that make it difficult to produce a commercially-viable counterfeit of the read/write device. The "feature" relates to the interface between the read/write device and a portable memory, and/or the interface between the read/write device and the rendering device. In either case, the feature is designed to make the read/write device incompatible with standard portable memories and/or standard rendering devices.

The premise of using such "features" is that a manufacturer of a trustworthy read/write device will build the feature(s) into the device, and will not build untrustworthy devices having the feature(s). Similarly, such features may be incorporated into portable memories that are usable with the device, and the manufacturer of the device may also oversee the production of such portable memories. The economic and legal hurdles to building a counterfeit (untrustworthy) device provide some barrier to the widespread replacement of trustworthy read/write devices with untrustworthy ones. Likewise, the hurdles to building a portable memory usable with the device provides a deterrent to manufacturing portable memories that work with the device but that could offload their contents to standard devices.

Preferably, the "feature" is a physical feature of the hardware; it is presumed that building untrustworthy hardware incorporating such a physical feature requires a sufficient economic investment that a casual counterfeiter would be deterred from building such a device. More preferably, the feature is legally proprietary, since the illegality and/or civil liability associated with building a counterfeit device incorporating the feature may further deter counterfeiters. It is preferable that the features be designed or selected with the following considerations in mind:

The feature is preferably resistant to a pure software attack. Thus, the feature should not be one that can easily be emulated by a program that can be widely published (e.g., by posting it on the Internet, etc.) and easily downloaded, installed and run by an unsophisticated user.

The feature is preferably resistant to hardware observation attacks that can be proliferated in the form of software attacks—e.g., a skilled attacker extracts secrets hidden in hardware and writes a program that uses those secrets for a software attack.

The feature is preferably resistant to simple hardware attacks—e.g., a skilled attacker analyzes the hardware setup and formulates and publishes simple hardware modifications to subvert content protection. These steps are sufficiently simple, such that naive users can execute them (e.g. set a jumper, clip a wire, etc.).

FIGS. 3A–3D show read/write devices having various examples of distinctive "features," as discussed above.

Figure 3A:
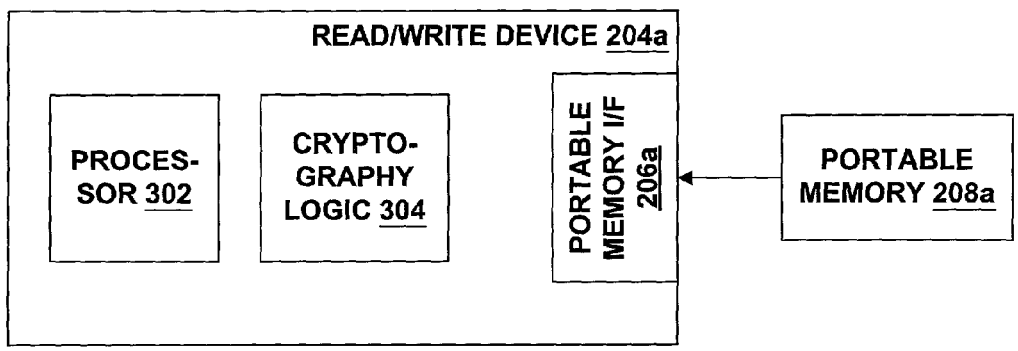
FIG. 3A is a block diagram of a first exemplary read/write device having an anti-counterfeit feature in accordance with aspects of the invention.

FIG. 3A shows a first exemplary read/write device 204a whose distinctive feature is a proprietary data manipulation algorithm, such as a proprietary cryptographic algorithm. Read/write device 204a includes cryptography logic 304 that executes on processor 302. Cryptography logic 304 implements a proprietary cryptographic algorithm. When read/write device 204a writes data onto portable memory 208a, it encrypts the data using the proprietary algorithm. When read/write device 204a reads data from portable memory 208a, it decrypts the data using the same proprietary algorithm.

"Proprietary" may have various meanings in this context. For example, the algorithm implemented by cryptography logic 304 may be a trade secret of the manufacturer of read/write device 204a. As another example, the manufacturer of read/write device 204a may own a copyright on the code that implements the algorithm, or mask work protection on a semiconductor chip that implements the algorithm. As a further example, the manufacturer of read/write device 204a may have a patent on the algorithm, or on a device that embodies the algorithm. The premise of the proprietary cryptographic algorithm is that, for any given data, it produces ciphertext that differs sufficiently from that produced by other cryptographic algorithms that no one can either produce or read the ciphertext without using the proprietary algorithm, and no one except for the manufacturer of read/write device 204a or his licensee can legally do so. Thus, any unauthorized read/write devices that employ the algorithm can be addressed through legal channels.

While a cryptographic algorithm is used in FIG. 3A as an example of a proprietary data manipulation algorithm, it will be appreciated that other types of data manipulation algorithms may be used, such as compression algorithms, printable character encoding algorithms, etc.

Figure 3B:
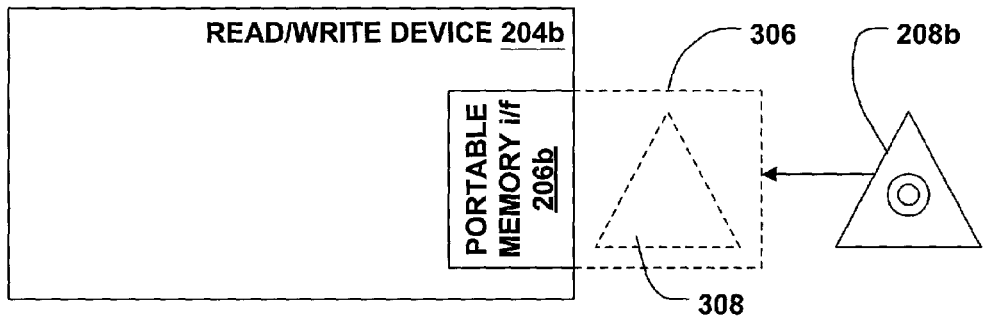
FIG. 3B is a block diagram of a second exemplary read/write device having an anti-counterfeit feature in accordance with aspects of the invention.

FIG. 3B shows a second exemplary read/write device 204b, whose distinctive feature is the ability to read a portable memory 208b having a non-standard shape. In this example, portable memory 208b is depicted as an optical "disk" having a triangular shape, which fits into the corresponding triangular recess 308 of tray 306. The significance of the triangular shape of the depicted optical disk is that such a shape is an example of a non-standard feature that would make portable memory 208b difficult or impossible to read or write using a standard optical disk drive, such as a CD-ROM drive, DVD-ROM drive, or mini-disk drive. It will be appreciated that an optical disk having a non-standard shape is merely a non-limiting example of a feature that makes portable memory 208b incompatible with standard read/write devices. Other examples of such a feature include: a disk having an unusual width or thickness that does not fit in standard optical disk trays, a disk having an off-center spindle hole, a disk having a non-standard track pattern that can be followed only by a specially-configured laser or magnetic head, a tape having a non-standard width; a tape cartridge having source and take-up spools in non-standard positions that do not align with the spindles of standard tape drives, etc. Optionally, these features may be proprietary to the manufacturer of read/write device 204b and/or the manufacturer of portable memory 208b. It should be appreciated that the examples listed above, or any other feature that makes portable memory 208b incompatible with standard hardware, may be used without departing from the spirit and scope of the invention.

FIG. 3C shows a third exemplary read/write device 204c, which is adapted to read portable memory 208c. In the example of FIG. 3C, portable memory 208c is a flash ROM or other type of memory that is read and/or written by "plugging" it into a read/write device rather than moving it across the head of a read/write device. Portable memory 208c connects to portable memory interface 206c of read/write device 204c using plug interface 310. As shown in FIG. 3D, plug interface 310 has a non-standard pin pattern 312, of which the serpentine pattern shown in FIG. 3D is a non-limiting example. The example of FIG. 3C is actually a special case of FIG. 3B, in that the non-standard pin pattern 312 of plug interface 310 is one example of a physical feature that makes portable memory 208c incompatible with standard devices that read and write flash ROMs.

Figure 4:
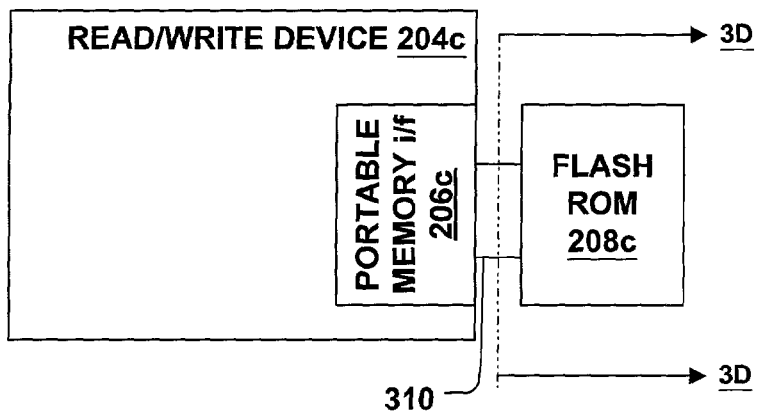
FIG. 4 is a block diagram of a fourth exemplary read/write device having an anti-counterfeit feature in accordance with aspects of the invention.
Figure 4:
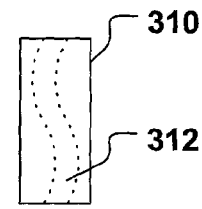
Figure 4:
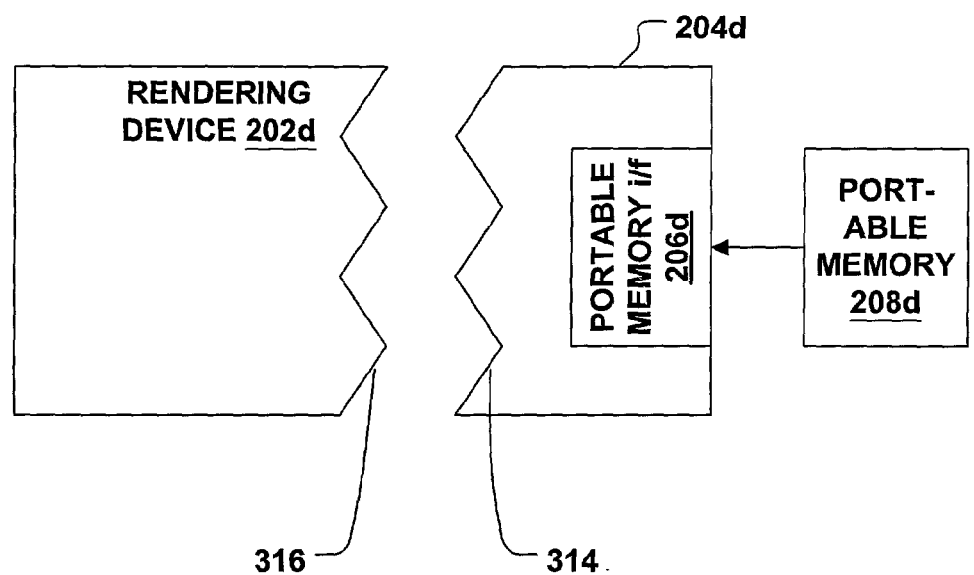

While FIGS. 3A–3D show examples of features that relate to the interface between a read/write device and a portable memory, the distinctive feature may also relate to the interface between the read/write device and the rendering device, and may serve to make the rendering device incompatible with standard read/write devices. FIG. 4 shows an example of such a feature.

In FIG. 4, read/write device 204d is adapted to read portable memory 208d, which is mountable on read/write device 204d at portable memory interface 206d. Portable memory 208d and portable memory interface 206d may include non-standard features as discussed in connection with FIGS. 3A–3D above. Additionally, read/write device 204d and rendering device 202d have non-standard connection interfaces 314 and 316, which are represented in the drawing by the non-limiting example of jagged surfaces. If, for example, standard read/write devices have only straight connection interfaces, then a standard read/write device will be unable to connect with rendering device 202d.

As discussed below, the features shown in FIGS. 3A–4 provide some assurance that a device incorporating those features is authentic. Specifically, if a read/write device incorporates a feature of the type shown in FIG. 4, a rendering device can send data to that read/write device knowing that the read/write device is either (a) trustworthy or (b) counterfeit. Moreover, a read/write device incorporating features as shown in FIGS. 3A–3D can write to a portable memory knowing that the memory will only be read by either (a) trustworthy read/write devices that incorporate the feature, or (b) counterfeit read/write devices. As discussed below, the disincentive to counterfeit a device may limit the number of counterfeit devices to an acceptably small level, such that the presence of the feature provides a sufficient basis to trust the device.

Flow of Protected Content

Figure 5:
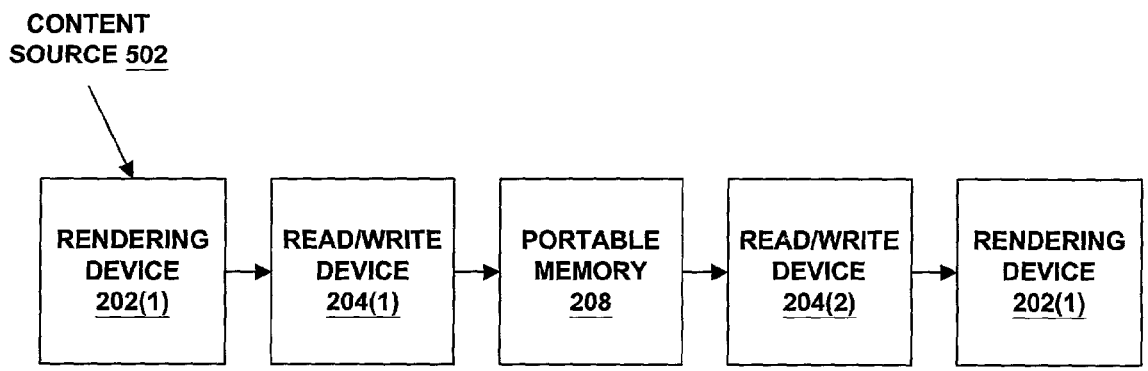
FIG. 5 is a block diagram showing the flow of content through rendering devices, read/write devices, and a portable memory in accordance with aspects of the invention.

FIG. 5 shows the path followed by a secure content item from one device to another by way of a portable memory in accordance with the invention. As discussed below, the security of the content is adequately ensured by the trust implicit in the non-standard physical or proprietary qualities of the read/write device.

Content originates at a content source 502. The content source may, for example, be a server that distributes copyrighted audio, video, text, etc. Typically, content source 502 is a computer that distributes content over a network, although this need not be the case. As an alternative example, content source 502 may, for example, be an optical or magnetic disk (e.g., optical disk 156 or magnetic disk 152, shown in FIG. 1) which is physically delivered to the recipient of the content. As a further example, content source 502 may be a hardware and/or software tool that facilitates the creation and recording of content, such as a microphone, video camera, or associated editing/filtering software.

Preferably, the content originating at content source 502 is bundled with an electronic license that specifies the rights or permissions associated with the content. Electronic licenses come in many forms and specify various parameters of usage. For example, an electronic license may specify whether content may be rendered, printed, copied, etc. It may specify the identity of a particular user who is permitted to use the content. It may specify time or quantity limits on the use of the content. It may specify the security level of the computing environment in which the content may be used. Electronic licenses are more fully described in U.S. Pat. No. 5,715,403, and U.S. patent application Ser. No. 09/290,363, which are incorporated by reference above. As previously noted, an explicit license is optional. Instead, there may be a global rule which implicitly "licenses" the content for some default usage, such as rendering of the content.

Content is delivered from content source 502 to rendering device 202(1). As discussed above, rendering device 202(1) has the capability to render content. Rendering device 202(1) in this example may also have the ability to transmit the content to another component—e.g., a single device 202(1) may be adapted to record content, render content, and transmit the content to another component such as read/write device 204(1). It should be observed that this ability to transmit the content to another component may also encompass the ability to propagate the content over a network, such as network 173 (shown in FIG. 1), although one aspect of trustworthiness is that device 202(1) will not do so unless permitted by the terms of the explicit or implicit license governing the content.

Rendering device 202(1) provides content to read/write device 204(1) so that it may be written onto portable memory 208. Rendering device 202(1) is a trusted component of the system. Thus, when it delivers content in usable form to read/write device 204(1), it authenticates read/write device 204(1) to ensure that the read/write device is trustworthy to handle protected content. This authentication may take place in various ways. In one example, rendering device 202(1) and read/write device 204(1) are equipped with processors such as processing unit 120 (shown in FIG. 1) and certified public/private key pairs. Thus, rendering device 202(1) and read/write device 204(1) may engage in an authentication protocol using the certified keys. Authentication protocols are known in the art, and therefore are not described herein.

In another example, rendering device 202(1)'s trust of read/write device 204(1) is implied by the hardware structure of read/write device 204(1). As described above in connection with FIG. 4, read/write device 204(1) may have a unique and/or proprietary hardware interface to rendering device 202(1). In this case, read/write device 204(1)'s authenticity may be implicit in the fact that it has been successfully interfaced with rendering device 202(1). This type of authentication is particularly useful where read/write device does not have sufficient processing capability to perform a cryptographic authentication protocol.

The reason for which the latter type of authentication works is somewhat counterintuitive and warrants additional explanation. In a trusted system, trust is not absolute but rather exists up to some acceptable level of certainty. For example, inasmuch as some authentication protocols are based on secret cryptographic keys, the possibility always exists that the secrecy of a key may have been compromised. However, measure are taken to protect the key, and thus a component that proves its authenticity through such an authentication protocol may be assumed to be authentic insofar as the key can be presumed not to have been compromised. Since keys can be stolen or otherwise compromised, proof of authenticity established in this manner is not perfect, but, in many contexts, may provide an acceptable level of certainty for the level of security required.

Similarly, when authenticity is established through a unique and/or proprietary hardware interface, the trustworthiness of the component is reliable to the extent that the hardware interface cannot be easily or legally "spoofed" by an untrustworthy component manufacturer. Because the manufacture of a compatible hardware interface requires a substantial investment by a manufacturer, it can be presumed that only a small number of spoofs of the hardware interface will exist. In the case of a proprietary interface, potential legal liability to the hardware manufacturer will provide a further deterrent to spoofing the interface. Thus, the economic and legal hurdles that stand in the way of spoofing the hardware interface provide at least some level of certainty that read/write device 204(1) is authentic. Again, it is important to note that this level of certainty is not absolute. There may be hardware spoofs of read/write device 204(1) that employ the necessary interface, and rendering device 202(1) will be fooled into concluding that such a counterfeit read/write device is authentic. However, if the relevant content is only in need of moderate protection (e.g., if the content is a song, rather than the password to launch nuclear missiles), this level of trust in read/write device 204(1)'s authenticity may be all that is required.

Once the content has been transmitted to read/write device 204(1), it may be recorded onto portable memory 208. Preferably, the relationship between 22read/write device 204(1) and portable memory 208 is of the type depicted in FIGS. 3A–3D—that is, read/write device 204(1) and/or portable memory 208 have some feature(s) that make portable memory 208 compatible with read/write device 204(1) and incompatible with standard read/write devices.

In a sense, the incompatibility of portable memory 208 with standard read/write devices ensures—up to some acceptable level of certainty—that content recorded on portable memory 208 will not escape the protected system. It is safe to record protected content onto portable memory 208 because portable memory 208 cannot be read by standard readers, and can only be read by readers incorporating a unique and/or proprietary feature. As is the case with the unique and/or proprietary interface between rendering device 202(1) and read/write device 204(1), the economic or legal hurdles to building a counterfeit read/write device 204(1) provide an "acceptable level of certainty" that portable memory 208 will not be readable by non-trusted readers. In this sense, the unique or proprietary interface provides a form of authentication that "travels" with portable memory 208: since only readers incorporating the unique or proprietary feature can read the memory, it can be assumed—up to an acceptable level of certainty—that every reader that will read portable memory 208 in the future is authentic and trustworthy.

It should be reemphasized that the proprietary encryption or data manipulation algorithm depicted in FIG. 3A is an example of a unique and/or proprietary feature, even though it provides no physical impediment to portable memory 208's being read by a standard reader. In such a case, the impediment to reading portable memory 208 with a standard reader is the legal hurdle of building a counterfeit reader that can undo the data manipulation in order to produce clear content. It should be further noted that, even in the case where the data manipulation algorithm is an encryption algorithm, the primary basis of trust is not in the encryption itself. It is entirely possible that the encryption scheme is weak, and the decryption key is well-known or subject to being compromised. The basis of trust, however, lies primarily in the illegality of building a device that performs the proprietary decryption, rather than the technical or engineering difficulty in decrypting content.

Once portable memory 208 stores the protected content, portable memory 208 may be mounted on a second read/write device 204(2). If the second read/write device 204(2) is able to read portable memory 208, then it is trustworthy—again, up to an acceptable level of certainty. As described above, while read/write device 204(2) may be a counterfeit device, the production of counterfeits is deterred by the economic and legal hurdles to building one, and thus it is unlikely that read/write device 204(2) is a counterfeit device.

Read/write device 204(2) is connected to a rendering device 202(2). Since read/write device 204(2) is a trusted component (or, at least, is likely to be a trusted component rather than a counterfeit), it does not release content to any component without authenticating that component. Authenticity between read/write device 204(2) and rendering device 202(2) may be established in the same manner as was authenticity between rendering device 202(1) and read/write device 204(1)—e.g., by an authentication protocol, by a unique and/or proprietary hardware interface, etc.

Once the content is made available to rendering device 202(2), it may be rendered so long as rendering is permitted by the terms of the explicit or implicit rules that govern the content.

It should be noted that a particularly useful example of the system shown in FIG. 5 is where rendering device 202(1) is an in-home rendering device (e.g., an audio or video device installed in a user's living room), and where rendering device 202(2) is a mobile rendering device (e.g., a car audio device, a palm-sized mini-TV, etc.). In this way, distributors of digital content may distribute reproducible copies of licensed content, where the explicit or implicit license includes permission to copy the content onto portable memory 208 (but not onto a standard medium, such as a CD-ROM). The content purchaser has the convenience of being able to make copies of the content for various devices, and the content distributor has the security of knowing that the universe of devices that can read the content is limited.

An additional refinement to the system depicted in FIG. 5 is to encrypt the content during some or all of the communications between components using, e.g., a conventional encryption algorithm. For example, content may be encrypted for transport between rendering device 202(1) and read/write device 204(1), or between read/write device 204(2) and rendering device 202(2), or for storage on portable memory 208. This encryption may be performed using a globally shared secret key. As noted above, since globally shared secrets can be compromised, they may not provide sufficient protection to serve as the sole root of trust for a trusted system, but encryption along the various communication channels may provide some additional protection against casual content snoops.

Figure 6:
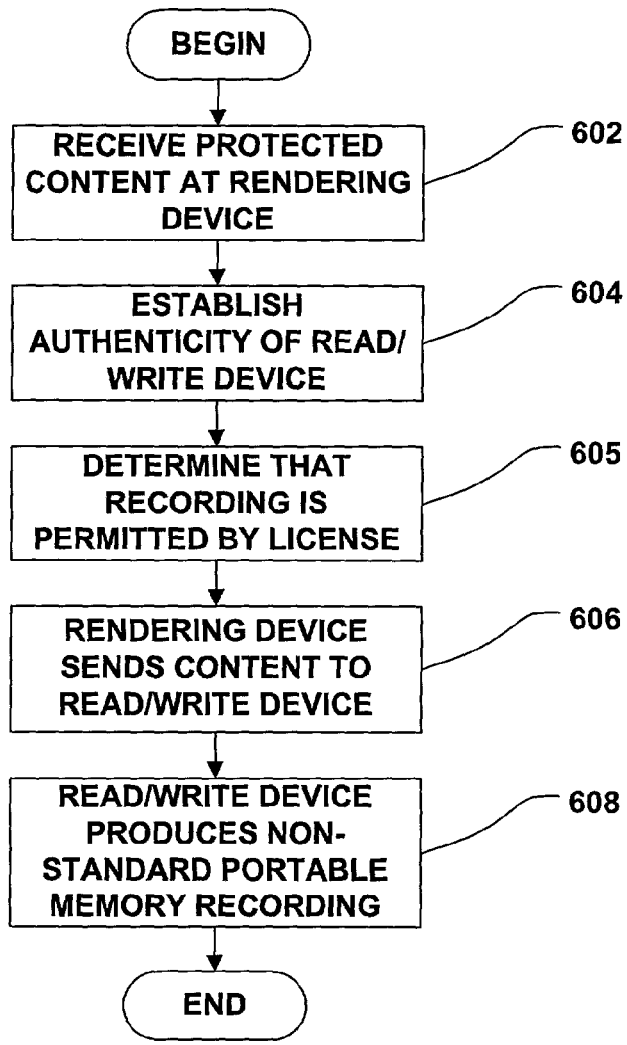
FIG. 6 is a flow diagram showing a process by which protected content is recorded to a portable memory.

FIG. 6 shows a process of storing content on a portable memory in accordance with the invention. At step 602, a rendering device receives protected content. Preferably, the content is associated with a license—either an explicit license (which may be received with the content), or an implicit license specifying global rules for all content handled by the rendering device. In this example, the rendering device is a trusted rendering device and, therefore, will not handle the content in any manner inconsistent with the license.

At step 604, the rendering device establishes the authenticity of an attached read/write device. This authenticity may be established by an authentication protocol, or by virtue of its connection to the read/write device being through a unique and/or proprietary interface.

At step 605, the rendering device evaluates the license to determine whether recording the content on a portable memory is within the terms of the license. Evaluation of the license may include either (a) reading an explicit digital license, or (b) applying the terms of a global implicit license. If such recording is permitted, the process may continue to step 606.

At step 606, the rendering device, having established the authenticity of the read/write device, sends the content to the read/write device. Optionally, the content is encrypted during the transmission in order to provide some level of security to the communication channel while the protected content is in transport between the rendering device and the read/write device.

At step 608, the read/write device produces a non-standard portable memory recording of the received content. As discussed above in greater detail, there are various ways to produce the "non-standard" recording through the use of a unique or proprietary feature. For example, read/write device may record onto a non-standard portable memory that is readable only by non-standard trusted readers incorporating a unique or proprietary feature. Alternatively, the recording may be made using a proprietary data manipulation algorithm such that the data can only be decrypted and/or decoded using a device that implements the proprietary algorithm. As a further alternative, both the portable memory and the data manipulation algorithm may be proprietary. It will be appreciated that there are various ways of producing a recording that cannot be read by a standard reader, and all such ways are within the spirit and scope of the invention.

As a further layer of security, step 608 may include encrypting the content using a conventional encryption algorithm and a globally shared secret key that is known to all trusted read/write devices. As noted above, such a globally shared secret may not provide sufficient security to serve as the root of trust for the entire system, but it may provide some additional security when used in combination with a read/write device that incorporates unique and/or proprietary features.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A method of recording data comprising the acts of:
   receiving protected content at a data processing device;
   determining that a portable memory recording device is trustworthy based on a proprietary physical hardware interface between said data processing device and said portable memory recording device, wherein determining that said portable memory recording device is trustworthy includes determining that said portable memory recording device will not record said protected content onto portable memories falling outside of a class ; and
   using said portable memory recording device to record said protected content onto a portable memory.

2. The method of claim 1, wherein the determination that said portable memory recording device will not record said protected content onto portable memories falling outside of a class is made with less than absolute certainty.

3. The method of claim 1, wherein a characteristic of said class is that portable memories falling inside said class are not readable by portable memory reading devices lacking a defined feature.

4. The method of claim 3, wherein said defined feature comprises a physical feature.

5. The method of claim 4, wherein said physical feature is a proprietary physical feature.

6. The method of claim 3, wherein said defined feature comprises a proprietary data handling algorithm.

7. The method of claim 1, further comprising the act of:
   determining that recording of said protected content onto said portable memory is permitted by the terms of a license governing said protected content.

8. A computer-readable medium having computer-executable instructions to perform the method of claim 1.

9. A method of recording protected data comprising the acts of:
   receiving protected content at a data processing device;
   determining that a portable memory recording device will not record said protected content onto portable memories falling outside of a class, wherein a characteristic of said class is that portable memories falling inside said class are not readable by portable memory reading devices lacking a physical proprietary hardware interface with said data processing device; and
   using said portable memory recording device to record said protected content onto a portable memory.

10. The method of claim 9, wherein the determination that said portable memory recording device will not record said protected content onto portable memories falling outside of a class is made with less than absolute certainty.

11. The method of claim 9, wherein a characteristic of said class is that portable memories falling inside said class are not readable by portable memory reading devices lacking a proprietary data handling algorithm.

12. The method of claim 9, wherein said act of determining that said portable memory recording device will not record said protected content onto portable memories falling outside of a class comprises engaging in an authentication protocol between said data processing device and said portable memory recording device.

13. A computer-readable medium having computer-executable instructions to perform the method of claim 9.

* * * * *